(12) United States Patent
Chou

(10) Patent No.: US 6,337,679 B1
(45) Date of Patent: Jan. 8, 2002

(54) INSTRUCTION INPUT DEVICE

(75) Inventor: Chin-Wen Chou, Taipei (TW)

(73) Assignee: Shin Jiuh Corp., Hsin Tien (TW)

( * ) Notice: Subject to any disclaimer, the term of this patent is extended or adjusted under 35 U.S.C. 154(b) by 0 days.

(21) Appl. No.: 09/414,519

(22) Filed: Oct. 8, 1999

(51) Int. Cl.[7] .................................................. G09G 5/08
(52) U.S. Cl. ....................... 345/156; 345/163; 345/167; 345/184; 341/34
(58) Field of Search ................................. 345/156, 160, 345/163, 167, 168, 164, 184; 341/22, 35

(56) References Cited

U.S. PATENT DOCUMENTS

| | | | | |
|---|---|---|---|---|
| 5,530,455 A | * | 6/1996 | Gillick et al. ................ 345/163 |
| 5,912,661 A | * | 6/1999 | Siddiqui ..................... 345/166 |
| 6,014,130 A | * | 1/2000 | Yung-Chou ................. 345/163 |
| 6,097,371 A | * | 8/2000 | Siddiqui et al. ............. 345/164 |
| 6,137,477 A | * | 10/2000 | Hu ............................. 345/163 |

* cited by examiner

Primary Examiner—Dennis-Doon Chow
(74) Attorney, Agent, or Firm—Bacon & Thomas, PLLC

(57) ABSTRACT

An instruction input device contains a baseboard having a set of pivot-jointing portions formed with two correspondent pivot holes for penetratingly disposing a shaft with a free end assembled and jointed to an instruction output switch. A flexible layer is assembled and jointed on surface of the shaft, and a coaxial force-bearing layer is further overlapped onto the flexible layer, wherein an instruction actuation switch is disposed on the baseboard at a proper position within reachable action range of the force-bearing layer. By applying the abovesaid simplified architecture, a mouse or a notebook computer with reduced weight, thickness, and size in a relatively lower cost is achievable.

6 Claims, 10 Drawing Sheets

INSTRUCTION INPUT DEVICE

BACKGROUND OF THE INVENTION

This invention relates to an improved instruction input device, particularly to an low cost instruction input device with a flexible layer in hardness lower than a shaft and a force-bearing layer to thereby provide distinct signals.

For simplifying operativity of programs used in the word processor or the internet, etc, a third axis (Z-axis) instruction input device is widely applied in a mouse or a notebook computer.

As show in FIG. 2, the instruction input device contains a baseboard having a plurality of predetermined movable pivot holes, a shaft penetratingly mounted in the movable pivot holes having a free end assembled and jointed with a instruction output switch, and a rotatable body coaxial with the shaft, wherein the other end of the shaft is fixedly jointed to a press-contact piece; and, an instruction actuation switch is located in action range of the press-contact piece. The rotatable body is driven to effect the instruction output switch to provide an output signal, or, is pressed to cause the shaft moving down that enables the press-contact piece to trigger the instruction output switch for effecting an output signal and rebounded back to its original state by restoring force of an elastomer disposed underneath the rotatable body.

The defects of abovesaid mechanism may be induced as the following:

1. Design of the instruction input device is too complicated with too many components to result in high cost, difficult assembly, and bulky volume of a mouse that usually causes unpleasant operation and a fatigue hand.
2. As the instruction input switch is composed of photo-grid pieces and cooperative sensing switches to read output signals, therefore, when the rotatable body is pressed to have the photo-grid pieces displaced synchronously, it is liable that the instruction input switch and the instruction actuation switch may transmit a signal concurrently to confuse reading of the instructions. This is especially true after use of a long-term period that may create offset between the movable pivot holes and the shaft to offer erroneous signals.

In order to improve abovesaid imperfections, another instruction input device shown in FIG. 1 has been developed later on trying to eliminate error readings by fixedly disposing the rotatable body and the instruction output switch at the same shaft on the baseboard, extending a press-contact piece from one side of the baseboard at a position corresponding with the instruction actuation switch, and, disposing one set of springs underneath the baseboard. It is known from FIG. 1, the revised design farther complicates the baseboard with a heavier weight and a bulkier volume, and moreover, for matching height of the shaft, the instruction output switch must be additionally wired to couple with the circuit board to further increase complexity of component disposition.

SUMMARY OF THE INVENTION

The primary object of this invention is to provide an instruction input device having a softer flexible layer and a coaxial force-bearing layer disposed at a common shaft, and when the force-bearing layer is pressed on its top end, the flexible layer will in turn press an instruction actuation switch via the force-bearing layer to effect a distinct output signal.

This invention contains a baseboard having a set of pivot-jointing portions formed with two correspondent pivot holes for penetratingly disposing a shaft with a free end assembled and jointed to an instruction output switch. A flexible layer is assembled and jointed on surface of the shaft, and a coaxial force-bearing layer is further overlapped onto the flexible layer, wherein an instruction actuation switch is disposed on the baseboard at a proper position within reachable action range of the force-bearing layer. By applying the abovesaid simplified architecture, a mouse or a notebook computer with reduced weight, thickness, and size in a relatively lower cost is obtainable.

BRIEF DESCRIPTION OF THE DRAWINGS

For a better understanding to the present invention, together with further advantages or features thereof, at least one preferred embodiment will be elucidated below with reference to the annexed drawings in which.

DETAILED DESCRIPTION OF THE PREFERRED EMBODIMENT

Figure 1:
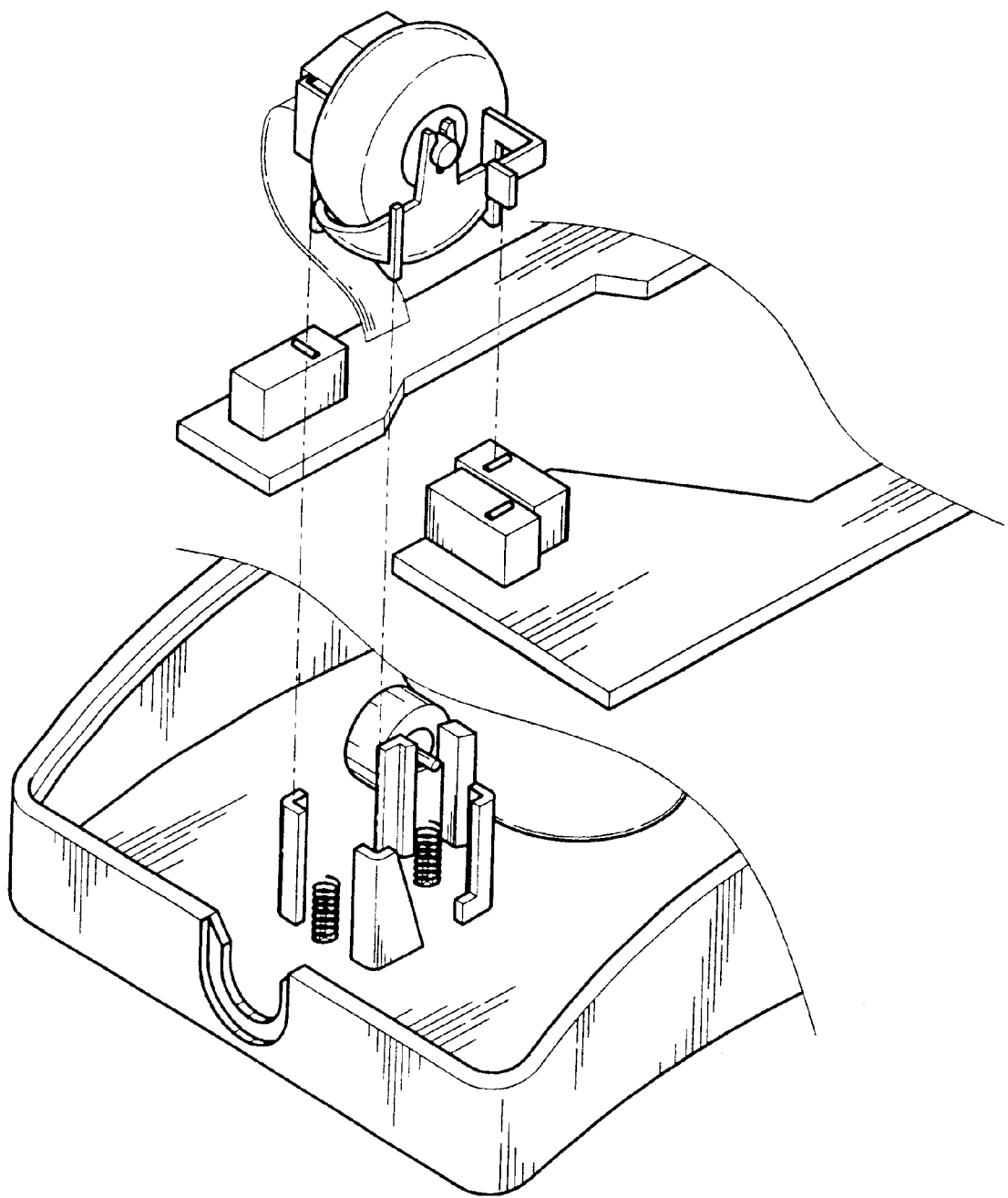
FIG. 1 is a schematic view showing structure of a conventional instruction input device.
Figure 2:
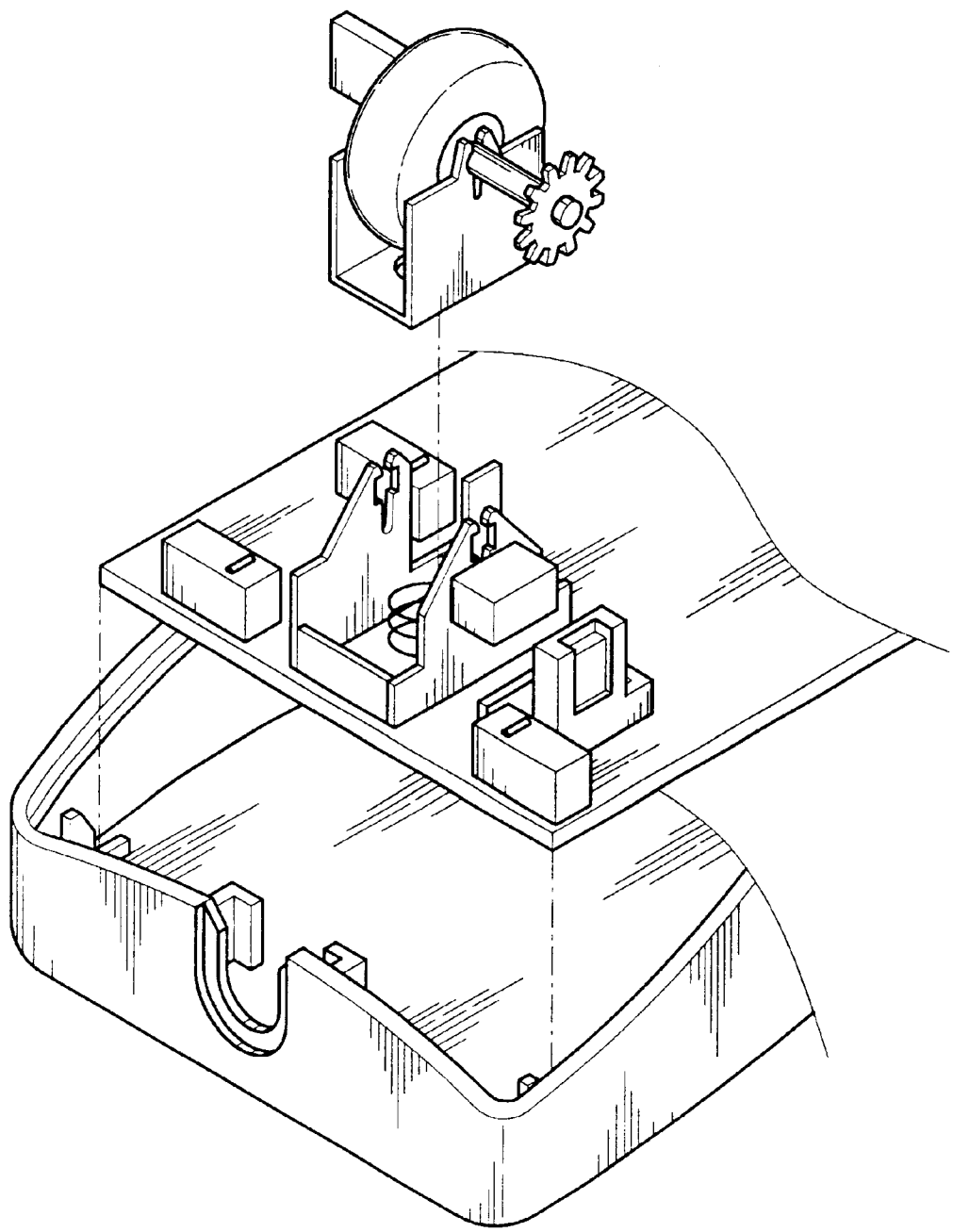
FIG. 2 is a schematic view showing structure of another conventional instruction input device.
Figure 3A:
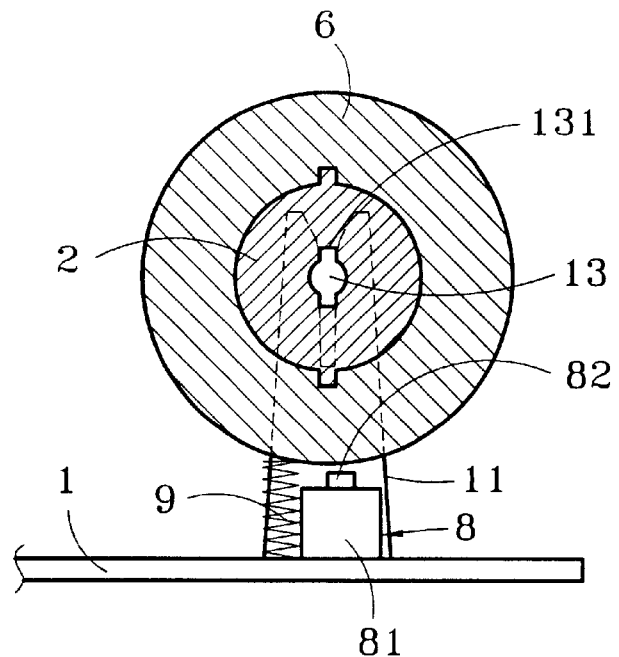
FIGS. 3A, 3B, 3C, 3D and 3E indicate combined action views of a first embodiment of this invention.
Figure 3B:
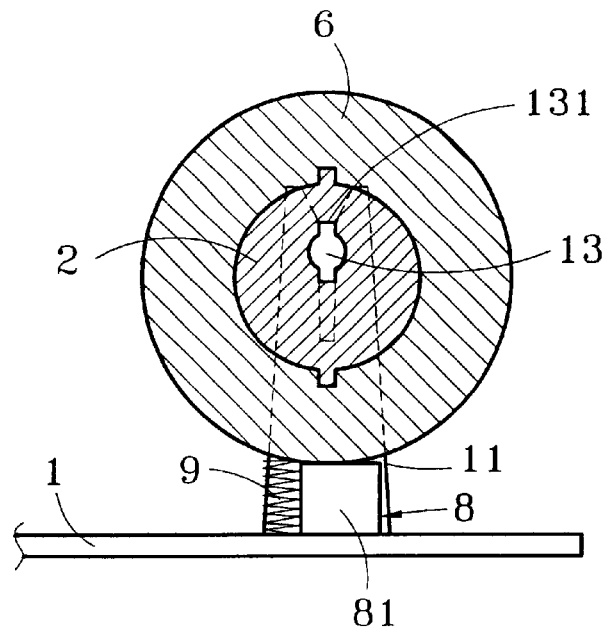
Figure 3C:
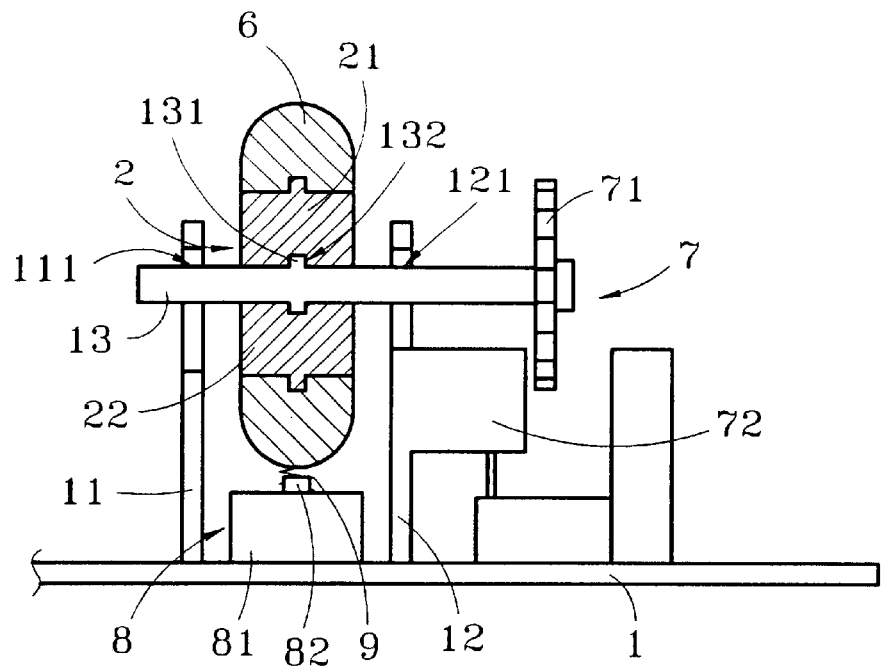
Figure 3D:
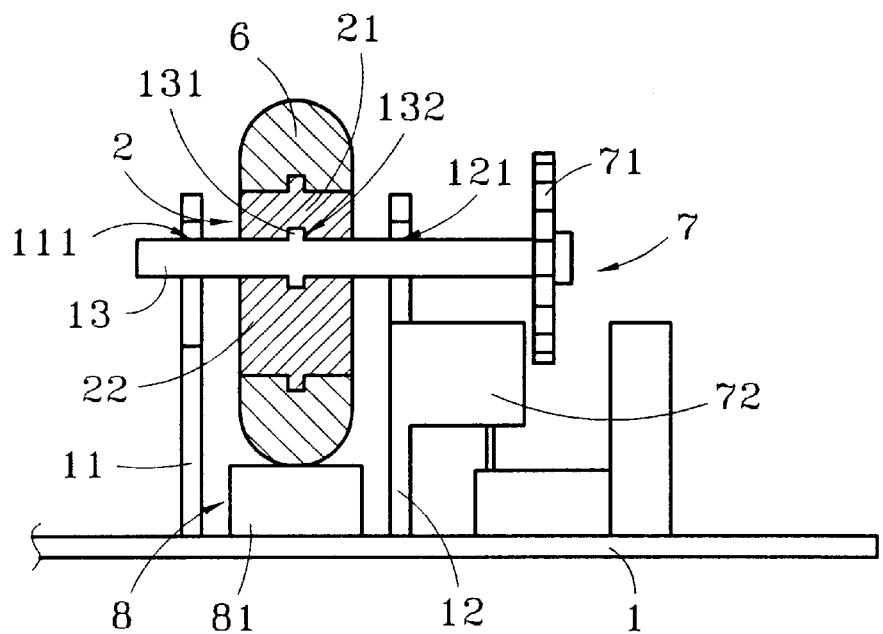
Figure 3E:
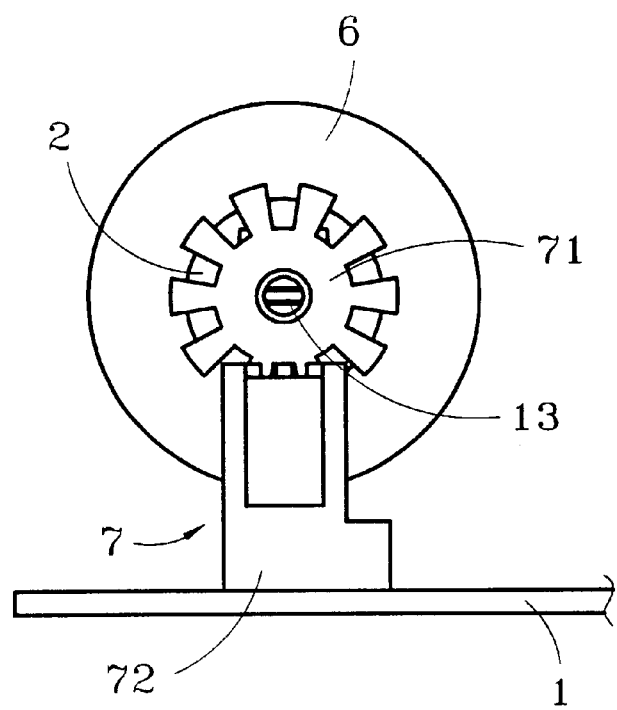

As shown in FIGS. 3A, 3C, and 3E, this invention comprises a baseboard 1 with a rotatably mounted shaft 13, a flexible layer 2 assembled on and jointed with the shaft 13, and a force-bearing layer 6 assembled on and jointed with the flexible layer 2.

A pair of pivot-jointing portions 11, 12 having a pivot hole 111, 121 each formed at corresponding positions is disposed at the baseboard 1, wherein the pivot holes 111, 121 are female-jointed with the shaft 13 which is provided with an instruction output switch 7 assembled and jointed to a free end of the shaft 13; and, an instruction actuation switch 8 and an adjacent auxiliary elastic element 9 are located within action range of the force-bearing layer 6 and between those two pivot-jointing portions 11, 12. The baseboard 1 is a printed or glued circuit board with circuit pattern, and the instruction output switch 7 can be in mechanic or photoelectric type. This invention, for example, is only concerned with the instruction output switch 7 of the photoelectric type comprising a photo-grid turntable 71 and a sensing module 72 for detecting light permeation. The instruction actuation switch 8 contains a coupling socket 81 fixedly disposed on the baseboard 1 with a conductive point 82 located thereon, or, the coupling socket 81 may be connected with another circuit board (not shown) via a cord.

The shaft 13 and the force-bearing layer 6 can be made of metal or harder plastic or rubber material while the flexible layer 2 can be made of sponge or softer plastic or rubber material that depends on predetermined product conditions for disposing the shaft 13, the flexible layer 2, and the force-bearing layer 6.

A first embodiment of this invention employing a spongy flexible layer 2 is shown in FIGS. 3B and 3D, wherein the flexible layer 2 and the force-bearing layer 6 are assembled to joint with the shaft 13 in sequence, and for facilitating squeeze of the flexible layer 2, the same may be slightly compressed when assembling, and for avoiding drop, a joint portion 131 and a groove 132 may be formed in the shaft 13, the flexible layer 2, and the force-bearing layer 6 respectively for accurate positioning. At this time, the shaft 13 is penetratingly disposed in the pivot holes 111, 121 of the pivot-jointing portions 11, 12 and coupled with the photo-grid turntable 71 of the instruction output switch 7, and meanwhile, the rim face of the force-bearing layer 6 is arranged to approach the auxiliary elastic element 9 and keep at a predetermined clearance with the conductive point 82 of the instruction actuation switch 8 to complete positioning an instruction input device.

When a user turns the force-bearing layer 6, the flexible layer 2 is driven to turn the photo-grid turntable 71 of the instruction output switch 7 at the other end of the shaft 13 to enable the sensing module 72 to effect a train of discrete functional output signal due to alternating light resisting and light permeating operation. During force is applied to the force-bearing layer 6, as the hardness of the flexible layer 2 is lower than that of the shaft 13 and the force-bearing layer 6, it is understood from the drawings that the upper part 21 of the flexible layer 2 is squeezed to shorten the distance between the force-bearing layer 6 and the shaft 13, while the lower part 22 is to exert its restoring force to the force-bearing layer 6 in addition to the external pressing force, thus the force-bearing layer 6 will in turn push the conductive point 82 to have the instruction actuation switch 8 effected an output signal. In the reason the shaft 13 is positioned in the pivot holes 111, 121 without movement, there is no way to cause any malfunction of the instruction output switch 7 for triggering an erroneous output signal. When the user removes his pressing force, the force-bearing layer 6 will rebound to its initial state owing to restoring force of the auxiliary elastic element 9 and the flexible layer 2.

Figure 4A:
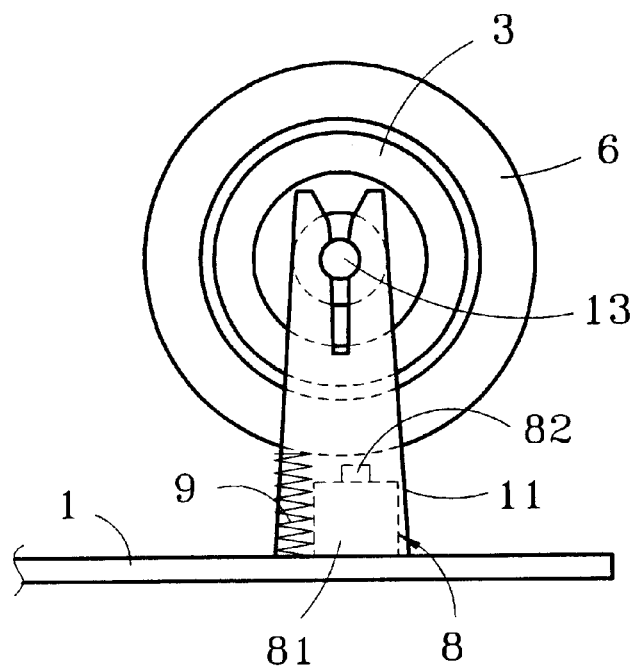
FIGS. 4A, 4B, and 4C indicate combined action views of a second embodiment of this invention.
Figure 4B:
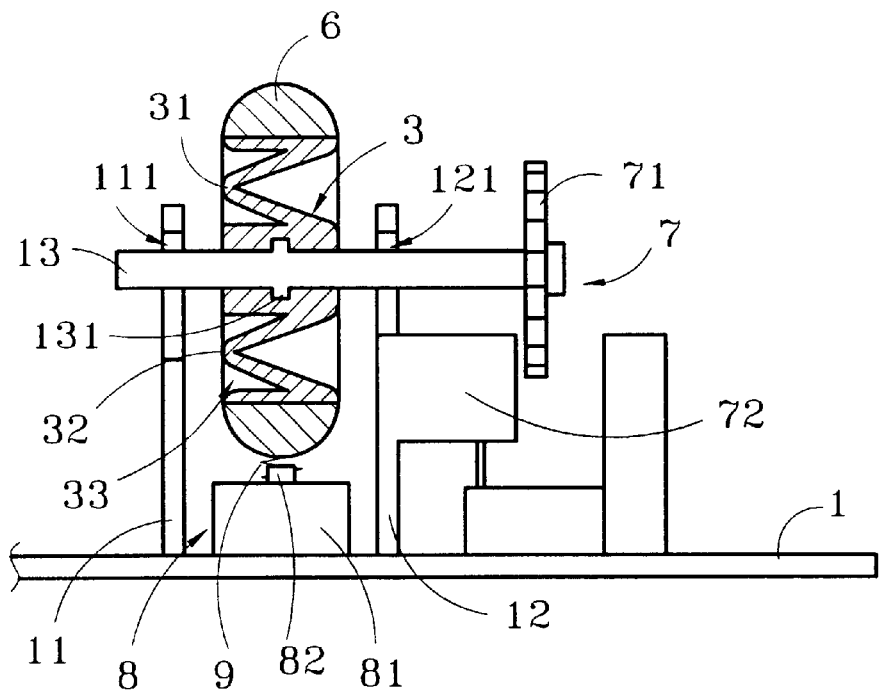
Figure 4C:
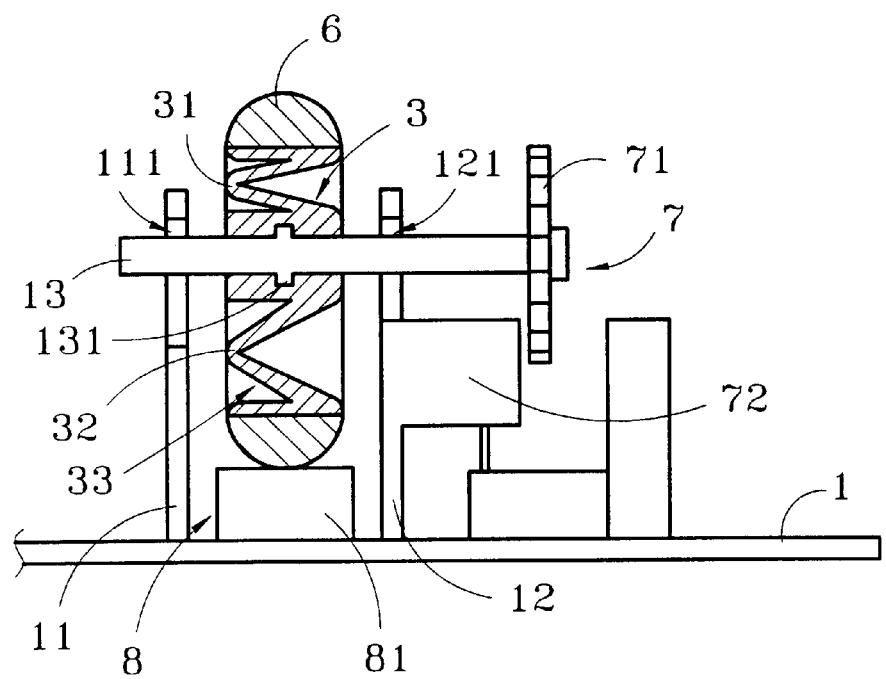

A second embodiment of this invention employing a flexible layer 3 made of relatively softer plastic or rubber material is shown in FIGS. 4A, 4B, and 4C. The flexible layer 3 contains a plurality of wavily folded turning points 31, 32 to form an elastic segment 33, which is slightly compressed to be loaded in the space between the force-bearing layer 6 and the shaft 13. In regard to the operation manner of this embodiment, as it is the same with the first one mentioned above, a lengthy repeated elucidation is duly omitted here.

Figure 5A:
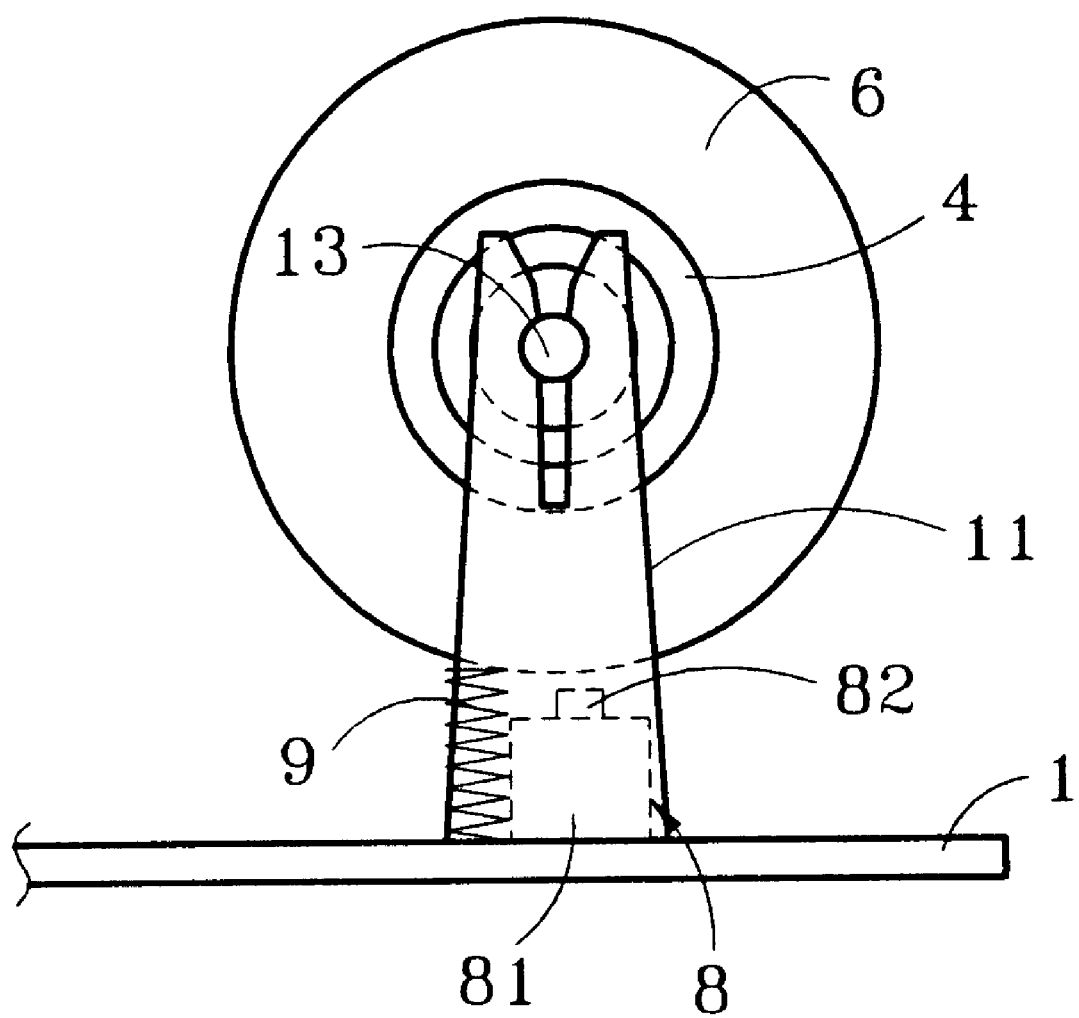
FIGS. 5A, 5B, and 5C indicate combined action views of a third embodiment of this invention.
Figure 5B:
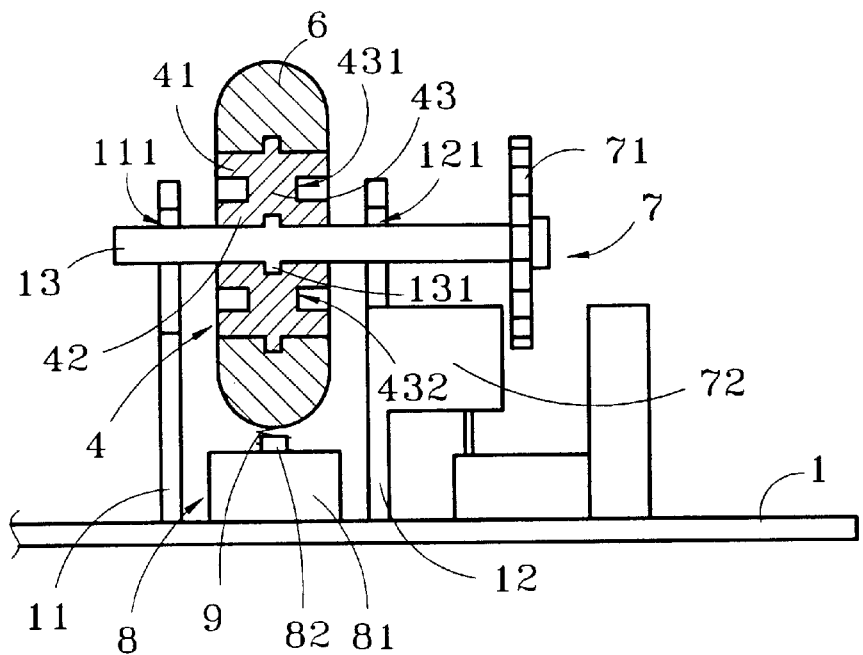
Figure 5C:
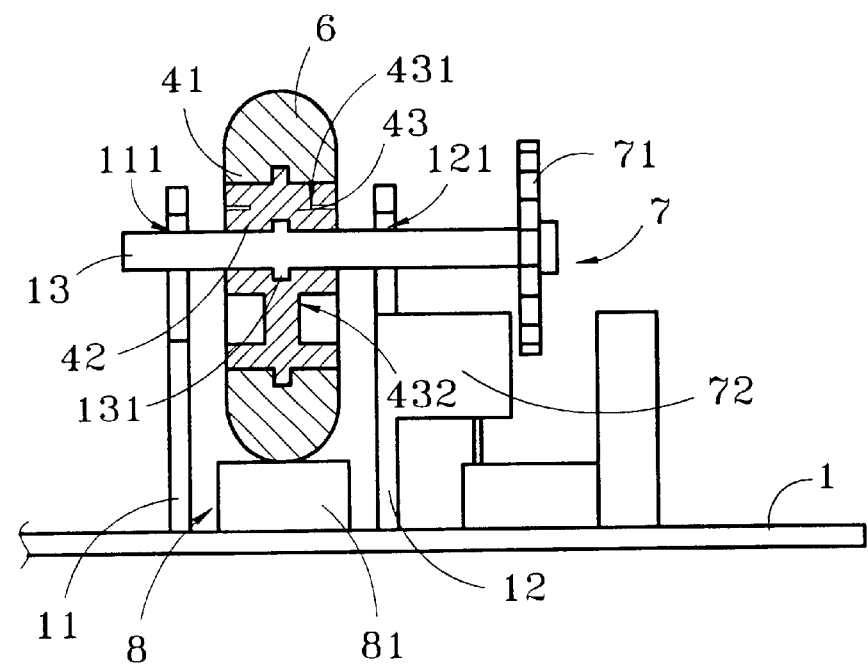

A third embodiment of this invention employing a flexible layer 4 made of relatively softer plastic or rubber material is shown in FIGS. 5A, 5B, and 5C. The flexible layer 4 contains an upper and a lower part, wherein each part further comprises a sub-part 41 jointing with the force-bearing layer 6, another sub-part 42 jointing with the shaft 13, and a slenderized waist 43 with a lateral recess 431, 432 at both sides (431 in the upper, 432 in the lower); and, the sub-part 41, 42 is slightly compressed to squeeze the waist 43 in assembling. When a force is applied to the top end of the force-bearing layer 6, the recess 431 of waist 43 is compressed, while the recess 432 is expended to press the force-bearing layer 6 and trigger the instruction actuation switch 8 to send out an output signal.

Figure 6A:
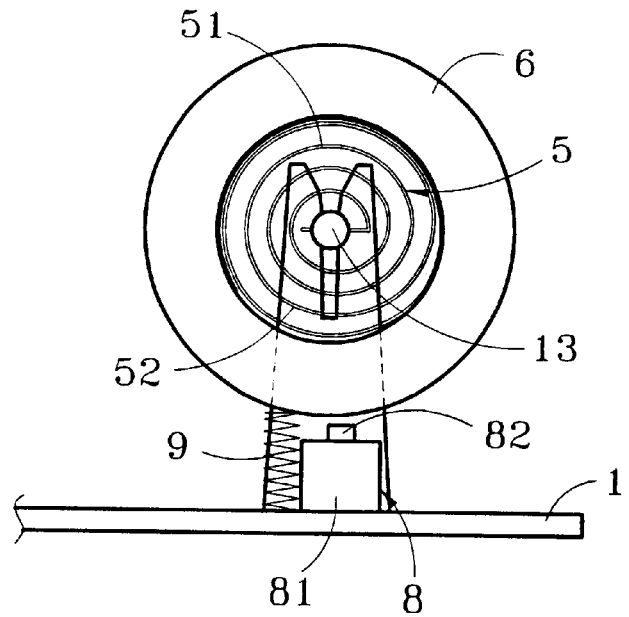
FIGS. 6A, 6B, and 6C indicate combined action views of a fourth embodiment of this invention.
Figure 6B:
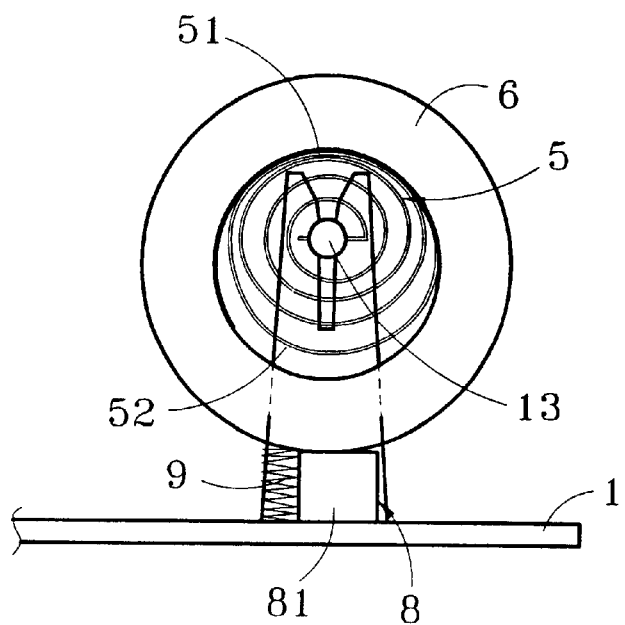
Figure 6C:
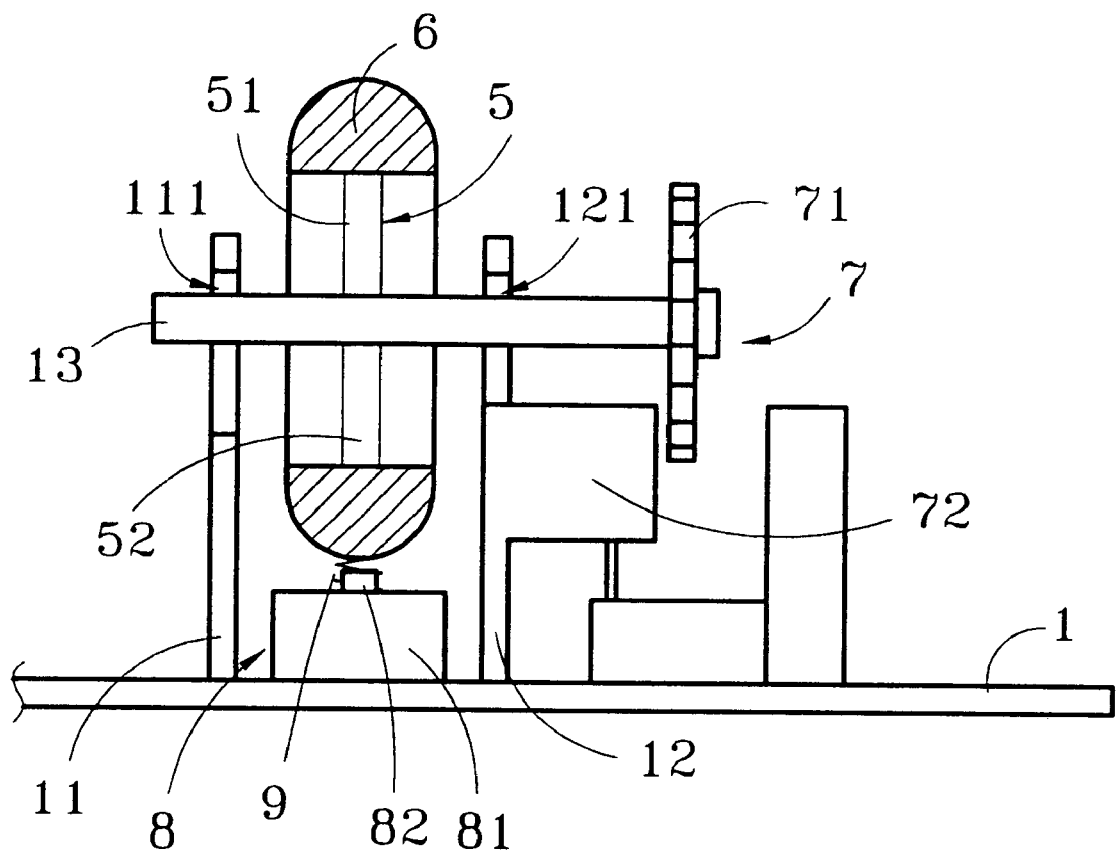

As shown in FIGS. 6A, 6B, and 6C, a flexible layer 5 made of elastomer, such as a spring or an elastic strip, is applied in a fourth embodiment of this invention. One end of the flexible layer 5 is inserted in the shaft 13, the other is wound to form a wind-up spring. When a force is applied on the top end of the force-bearing layer 6, a relative upper layer 51 is squeezed and a relative lower layer 52 is elastically restored to expand downwards and press the force-bearing layer 6 and so doing to the instruction actuation switch 8 for effecting an output signal.

Although, this invention has been described in terms of preferred embodiments, it is apparent that numerous variations and modifications may be made without departing from the true spirit and scope thereof, as set forth in the following claims.

What is claimed is:

1. An instruction input device, comprising:
   a baseboard having a pair of pivot-jointing portions disposed at proper positions thereon and formed with two correspondent pivot holes, wherein a shaft having a free end assembled and jointed with an instruction output switch is penetratingly mounted in said pivot holes;
   a flexible layer assembled and jointed with said shaft on its outer circular face;
   a force-bearing layer made of a material harder than said flexible layer assembled and jointed on said flexible layer at its outer circular face; and
   an instruction actuation switch assembled and disposed at a position within reachable action range of said force-bearing layer;
   wherein said force-bearing layer is pressed to drive said flexible layer to actuate the instruction output switch at one end of said shaft to effect an output signal; and said flexible layer softer than said shaft and said force-bearing layer, said flexible layer is squeezed to push said force-bearing layer to in turn press said instruction actuation switch to effect an output signal.

2. The instruction input device according to claim 1, wherein said shaft is made of metal, harder plastic or rubber material.

3. The instruction input device according to claim 1, wherein said force-bearing layer is made of metal, harder plastic or rubber material.

4. The instruction input device according to claim 1, wherein said flexible layer is made of sponge, softer plastic or rubber material.

5. The instruction input device according to claim 1, wherein said flexible layer is formed with an elastomer.

6. The instruction input device according to claim 1, wherein an auxiliary elastic element is disposed at a position within reachable action range of said force-bearing layer and adjacent to said instruction actuation switch for assisting said force-bearing layer to restore to original state.

* * * * *